May 12, 1925.
C. NUHRING
SPANNER FOR HOSE COUPLINGS
Filed Oct. 27, 1923
1,537,872
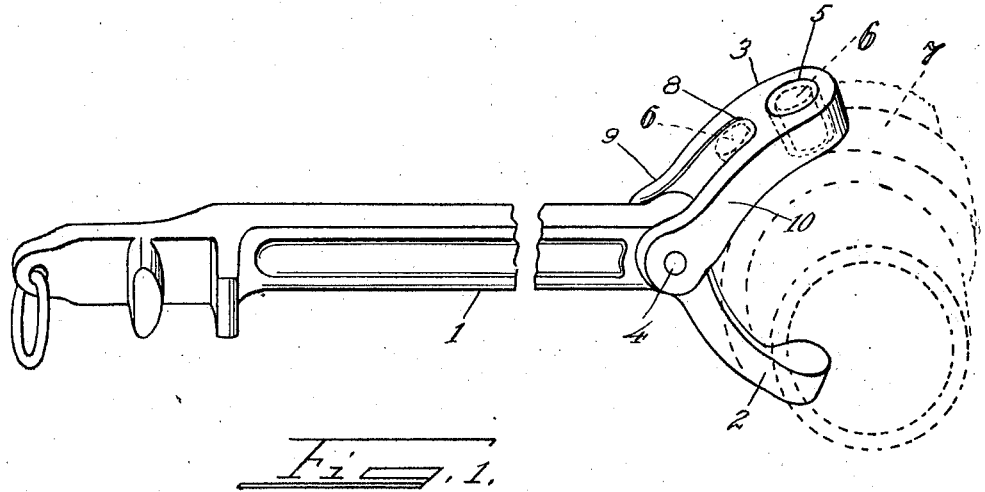
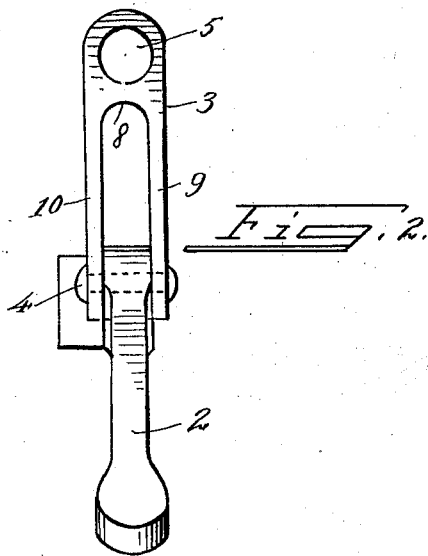
INVENTOR:
Charles Nuhring,
BY Arthur H. Ewald,
ATTORNEY.

Patented May 12, 1925.

1,537,872

UNITED STATES PATENT OFFICE.

CHARLES NUHRING, OF CINCINNATI, OHIO.

SPANNER FOR HOSE COUPLINGS.

Application filed October 27, 1923. Serial No. 671,260.

*To all whom it may concern:*

Be it known that I, CHARLES NUHRING, a citizen of the United States, and resident of the city of Cincinnati, in the county of Hamilton and State of Ohio, have invented certain new and useful Improvements in Spanners for Hose Couplings, of which the following is a full, clear, and exact description, reference being had to the accompanying drawings, forming a part of this specification.

My invention relates to spanners for hose couplings.

The principal object of my invention is to provide a spanner which is adapted for use on hose couplings of varying sizes.

Further objects of the invention will appear from the following detailed description thereof.

In the drawings:—

Figure 1 is a perspective view of a hose spanner constructed in accordance with this invention; and Fig. 2 is an end view of said spanner.

The numeral 1 indicates a bar, preferably of metal construction. The bar 1 is provided with a prong or arm 2, which is of curved construction and is angularly disposed with reference to the bar 1. Adapted to be secured to the bar 1 at the junction of said bar with the prong 2, is an arm 3, one end of which is of bifurcated construction, so as to admit the bar 1. The arm and bar 1 are pivotally connected by means of a pin 4. The free end of the arm 3 is provided with an opening 5 which is adapted to engage the usual pin 6 on the coupling 7, as shown in dotted lines in Fig. 1. The crotch 8 between the forks 9 and 10 of the arm 3 is also of such dimension as to engage the pin 6. The arm 3 is of curved construction, corresponding to that of arm 2, so that the inner faces of the arms 2 and 3 are adapted to engage around the coupling.

From the foregoing description, the nature and use of my invention will be apparent to those skilled in the art to which the same appertains.

When used on small couplings the spanner is applied with the pin 6 of the coupling, resting against the base 8 of the bifurcated arm 3, the arm 2 performing its usual function as a fulcrum for turning the coupling, the bar 1 being used as a handle or lever. When used on larger couplings the pin 6 is engaged in the opening 5 at the end of the arm 3, the device operating otherwise the same as on the smaller coupling.

Having thus fully described my invention what I claim as new, and desire to secure by Letters Patent, is:—

1. A spanner for hose couplings, comprising a bar, an arm angularly disposed with respect to said bar, a second arm, said second arm being bifurcated at one end so as to admit said bar, and means for pivotally securing the forks of said second arm to said bar, the crotch between said forks being adapted to engage the pin of a hose coupling.

2. A spanner for hose couplings, comprising a bar, an arm angularly disposed with respect to said bar, a second arm, said second arm being bifurcated at one end so as to admit said bar, and means for pivotally securing the forks of said second arm to said bar, the crotch between said forks being adapted to engage the pin of a hose coupling, and said arms being curved so that their inner surfaces may form complementary arcs.

3. A spanner for hose couplings, comprising a bar, an arm angularly disposed with respect to said bar, a second arm, said second arm being bifurcated at one end so as to admit said bar, and means for pivotally securing the forks of said second arm to said bar, the crotch between said forks being adapted to engage the pin of a hose coupling, and said second arm being provided with a perforation beyond the crotch adapted selectively to engage said pin.

4. A spanner for hose couplings, comprising a bar, an arm angularly disposed with respect to said bar, a second arm, said second arm being bifurcated at one end so as to admit said bar, and means for pivotally securing the forks of said second arm to said bar, the crotch between said forks being adapted to engage the pin of a hose coupling, said second arm being provided with a perforation beyond the crotch adapted selectively to engage said pin, and said arms being curved so that their inner surfaces may form complementary arcs.

CHARLES NUHRING.